US011966185B2

(12) United States Patent
Fuse et al.

(10) Patent No.: US 11,966,185 B2
(45) Date of Patent: Apr. 23, 2024

(54) IMAGE FORMING APPARATUS

(71) Applicant: CANON KABUSHIKI KAISHA, Tokyo (JP)

(72) Inventors: Yasuhiko Fuse, Mishima (JP); Yuji Nakayashiki, Numazu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 17/950,177

(22) Filed: Sep. 22, 2022

(65) Prior Publication Data

US 2023/0017371 A1 Jan. 19, 2023

Related U.S. Application Data

(62) Division of application No. 16/831,966, filed on Mar. 27, 2020, now Pat. No. 11,474,469.

(30) Foreign Application Priority Data

Apr. 10, 2019 (JP) ................................ 2019-074800

(51) Int. Cl.
*G03G 15/00* (2006.01)
*G03G 15/09* (2006.01)

(52) U.S. Cl.
CPC ..... *G03G 15/6511* (2013.01); *G03G 15/0914* (2013.01); *G03G 15/6597* (2013.01)

(58) Field of Classification Search
CPC ....... G03G 2221/1684; G03G 21/1853; G03G 21/1623; G03G 21/1647; G03G 21/1821; G03G 21/1633
See application file for complete search history.

(56) References Cited

U.S. PATENT DOCUMENTS 4,860,050 A 8/1989 Kurotori et al.
5,208,612 A * 5/1993 Obu .................. G03G 21/1604 399/361

(Continued)

FOREIGN PATENT DOCUMENTS

EP 0 814 386 A2 12/1997
JP H06-250456 A 9/1994

(Continued)

OTHER PUBLICATIONS

Chinese Office Action dated Jun. 28, 2023, in related Chinese Patent Application No. 202010277339.1 (with English translation).

(Continued)

*Primary Examiner* — Jessica L Eley
(74) *Attorney, Agent, or Firm* — VENABLE LLP

(57) ABSTRACT

An image forming apparatus includes an image forming portion including a photosensitive member and a developing portion, a sheet accommodating portion, a sheet feeding portion, and a first frame. The first frame includes an upper space supporting the image forming portion, and a lower space under the upper space. A second frame is mountable to a lower portion of said first frame. The accommodating portion and the feeding portion are replaceable with a supply container containing toner to be supplied to a developing portion of the image forming portion, in which the second frame supports the accommodating portion and the feeding portion.

9 Claims, 9 Drawing Sheets

(56) References Cited

U.S. PATENT DOCUMENTS

| | | | | |
|---|---|---|---|---|
| 5,600,445 | A * | 2/1997 | Omi | H04N 1/32561 358/401 |
| 5,909,609 | A * | 6/1999 | Yahata | G03G 15/0886 399/30 |
| 6,091,912 | A | 7/2000 | Kitajima et al. | |
| 8,807,552 | B2 | 8/2014 | Kondo et al. | |
| 2008/0152389 | A1 | 6/2008 | Kim | |
| 2011/0013932 | A1* | 1/2011 | Fujita | G03G 21/1685 399/110 |
| 2013/0308976 | A1 | 11/2013 | Sekido | |
| 2014/0178095 | A1 | 6/2014 | Souda | |
| 2017/0205762 | A1 | 7/2017 | Amann et al. | |
| 2018/0088518 | A1 | 3/2018 | Fuse | |
| 2019/0377283 | A1 | 12/2019 | Suzuki et al. | |

FOREIGN PATENT DOCUMENTS

| | | | |
|---|---|---|---|
| JP | H10-333412 | A | 12/1998 |
| JP | 2002-244529 | A | 8/2002 |
| JP | 2009-037187 | A | 2/2009 |
| JP | 2009-294561 | A | 12/2009 |
| JP | 2010-262308 | A | 11/2010 |
| JP | 2018-057146 | A | 4/2018 |
| JP | 2018-128646 | A | 8/2018 |

OTHER PUBLICATIONS

European Search Report dated Sep. 25, 2020, in related European Patent Application No. 20167681.4.
European Office Action dated Apr. 13, 2022, in related European Patent Application No. 20167681.4.
Japanese Office Action dated Jan. 31, 2023, in related Japanese Patent Application No. 2019-074800.

* cited by examiner (a)

(b)

IMAGE FORMING APPARATUS

This application is a divisional of application Ser. No. 16/831,966, filed Mar. 27, 2020.

FIELD OF THE INVENTION AND RELATED ART

The present invention relates to an image forming apparatus, such as a copying machine, a printer or a multi-function machine, for forming an image by an electrophotographic process.

In the image forming apparatus using the electrophotographic process, there is a type in which an electrostatic latent image formed on an image bearing member is developed and visualized as a toner image with toner or the like which is a developer by a developing portion. As the image bearing member, a cylindrical photosensitive drum, an endless photosensitive belt and the like are used. The toner image formed on the image bearing member is transferred onto a sheet by a transfer portion and is fixed on the sheet by a fixing portion using pressure, heat and the like.

In such an image forming apparatus, there is a type in which an image forming portion is constituted by including, together with the image bearing member and the developing portion, a toner accommodating portion accommodating the toner (Japanese Laid-Open Patent Application (JP-A) 2018-057146). On the other hand, there is also a type in which the toner accommodating portion is provided as a supply unit capable of being exchanged (replaced) separately from an image forming portion including the image bearing member and the developing portion and when the toner is consumed by the image forming portion, the toner is supplied from the supply unit to the image forming portion (JP-A 2018-128646).

As regards the image forming apparatuses of both types, although structures relating to toner supply are different from each other, other constituent elements are functionally the same, and therefore, it is preferable to achieve commonality of the constituent elements (units) with the same functions to the extent possible. On the other hand, an apparatus main assembly frame for holding the respective units that are different in component parts is required in the structures of the above-described types, and therefore, a frame individually optimized for each of the types was used conventionally.

For this reason, in the case where the image forming apparatuses of different types as described above are manufactured in parallel, there arose a problem such that the number of component parts to be subjected to inventory management (control) increases and a management load increases.

SUMMARY OF THE INVENTION

Therefore, a principal object of the present invention is to provide an image forming apparatus operable as different types and capable of achieving commonality of an apparatus main assembly frame to the greatest extent possible.

According to an aspect of the present invention, there is a provided an image forming apparatus comprising: an image forming portion including a photosensitive member and a developing portion configured to develop, with toner, an electrostatic latent image formed on the photosensitive member, the image forming portion being configured to form an image on the sheet; an accommodating portion configured to accommodate the sheet; a feeding portion configured to feed the sheet accommodated in the accommodating portion; and a first frame including an upper space supporting the image forming portion, and a lower space under the upper space, wherein a second frame is mountable to a lower portion of the first frame, wherein the accommodating portion and the feeding portion are replaceable with a supply container containing the toner to be supplied to the developing portion of the image forming portion, in which the second frame supports the accommodating portion and the feeding portion.

Further features of the present invention will become apparent from the following description of exemplary embodiments with reference to the attached drawings.

Figure 4:
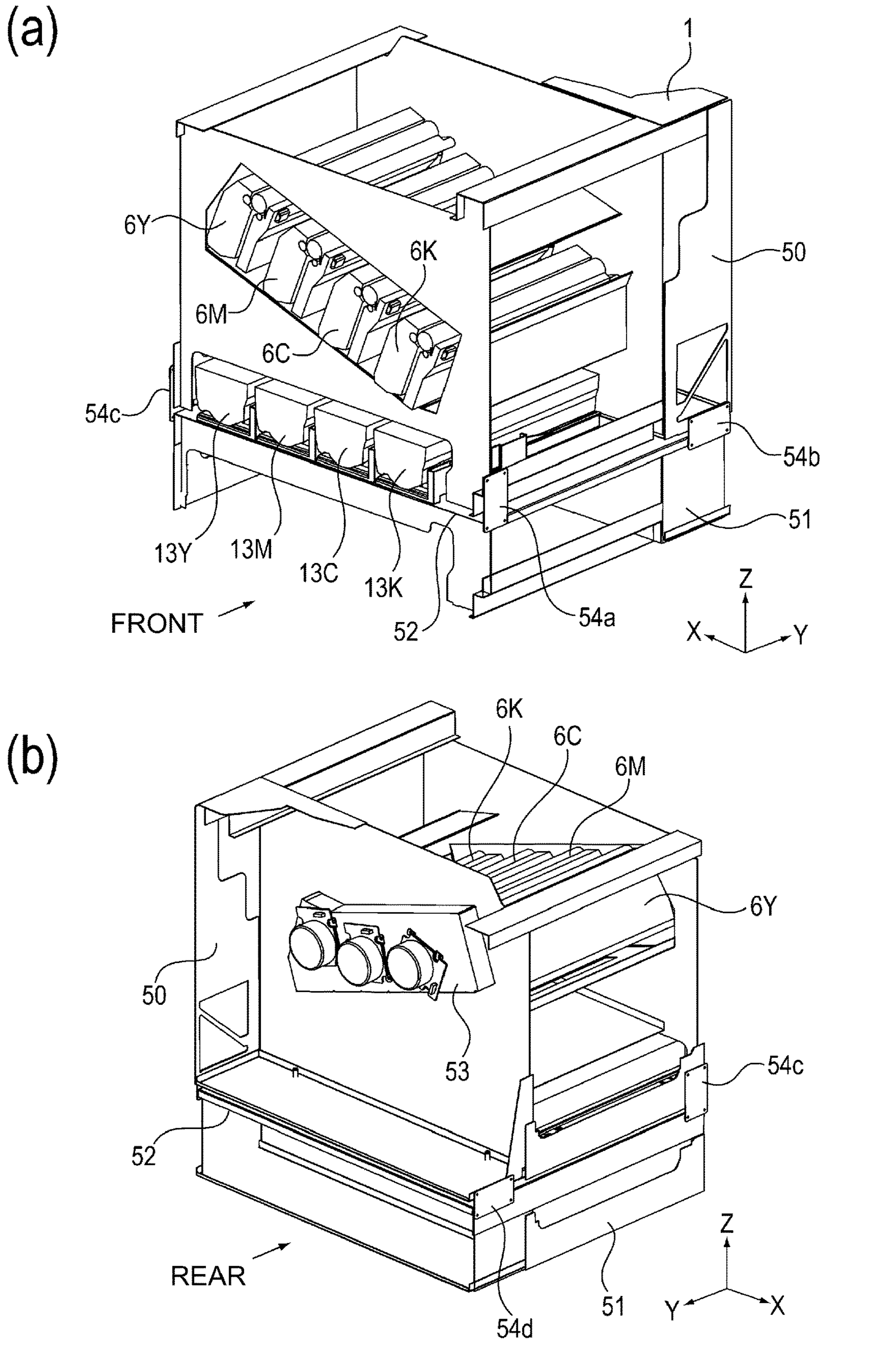

Parts (a) and (b) of FIG. 4 are perspective views of frames of the supply-type image forming apparatus.

Figure 5:
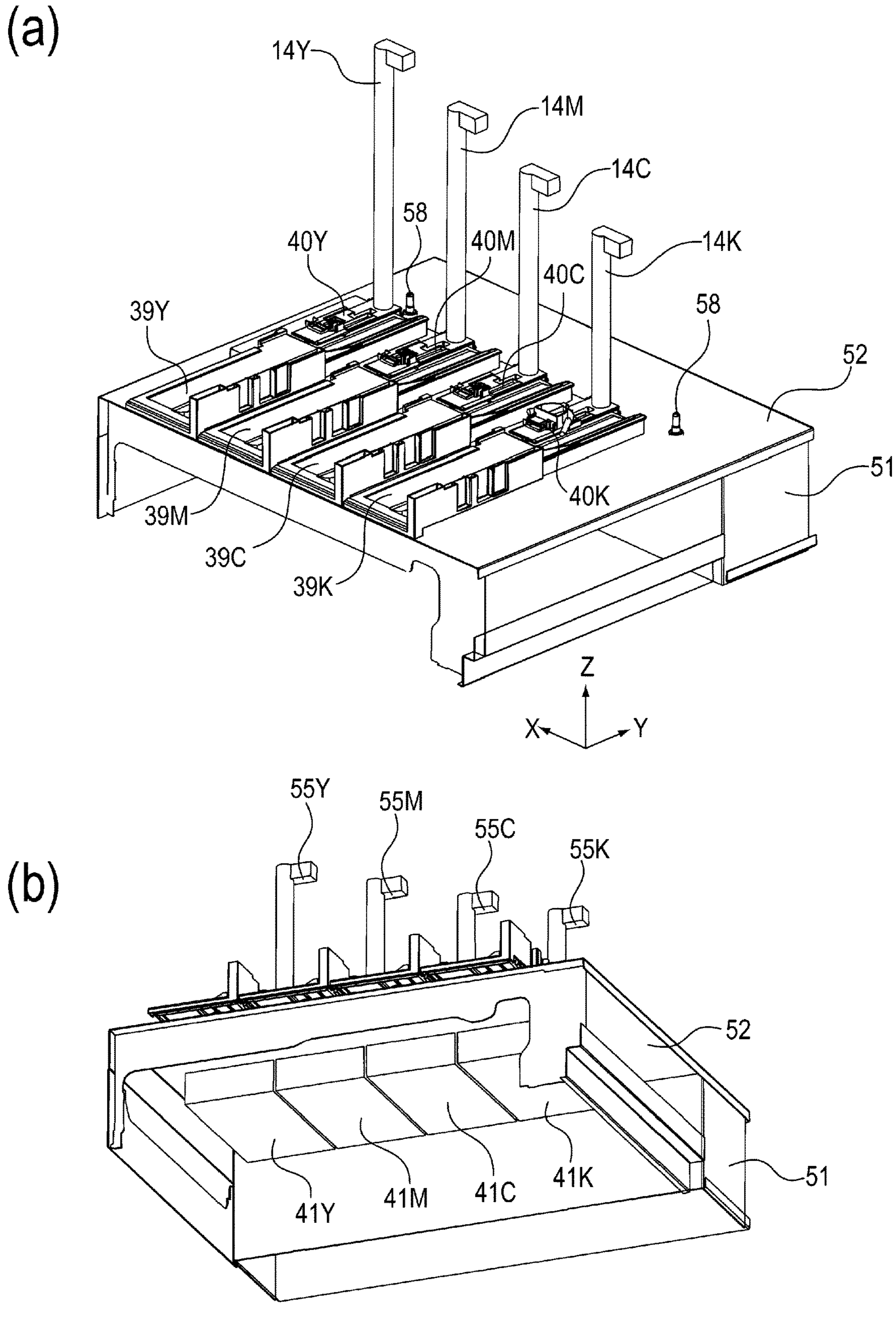

Parts (a) and (b) of FIG. 5 are perspective views of a second frame of the supply-type image forming apparatus.

Figure 6:
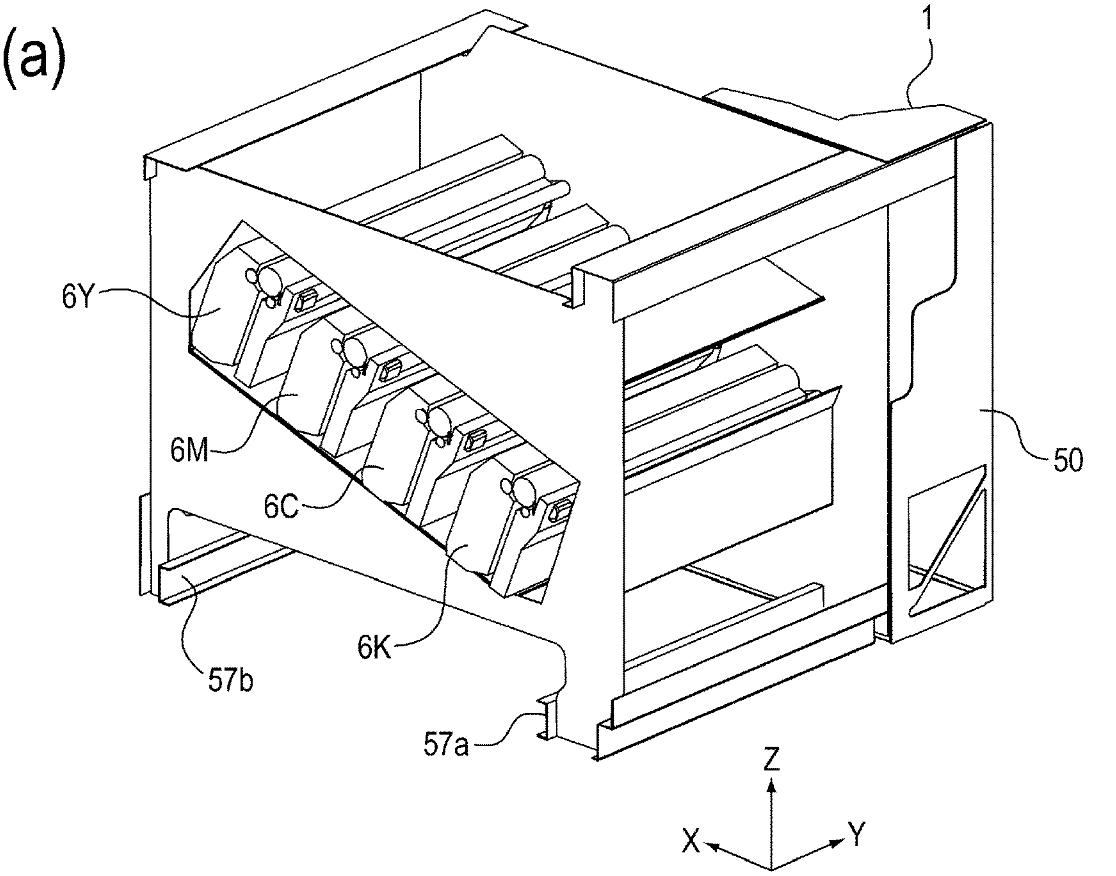
Figure 6:
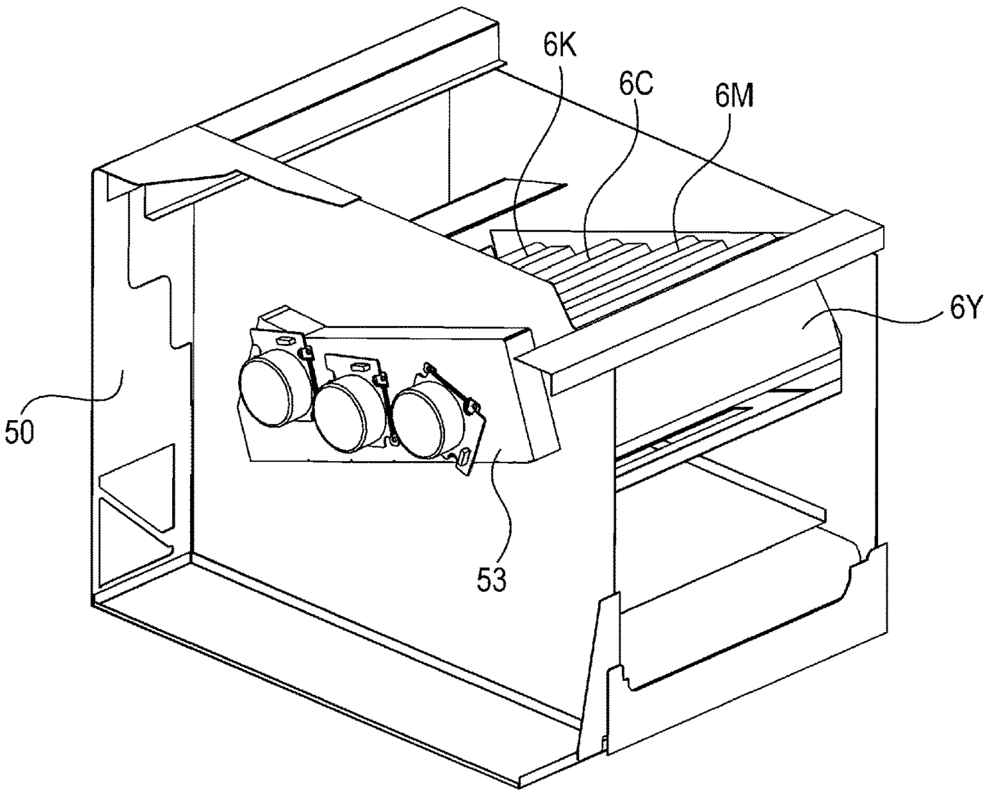

Parts (a) and (b) of FIG. 6 are perspective views of a first frame of the integral-type image forming apparatus.

Figure 7:
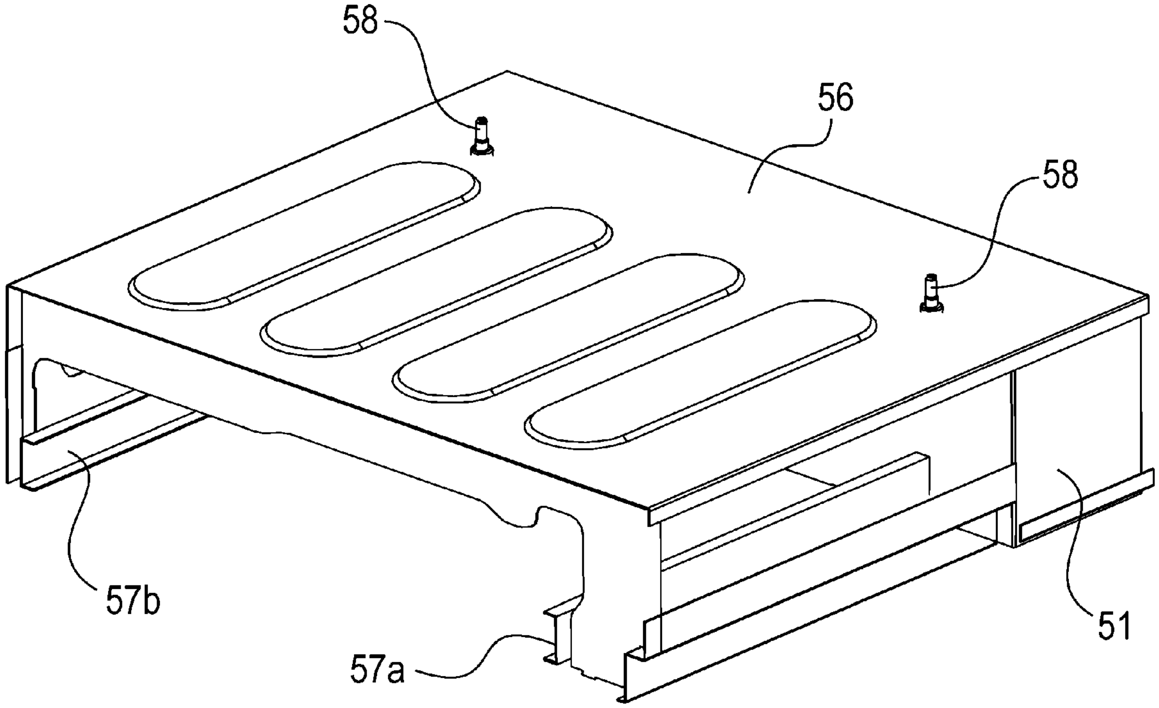

FIG. 7 is a perspective view of a second frame of the integral-type image forming apparatus.

Figure 8:
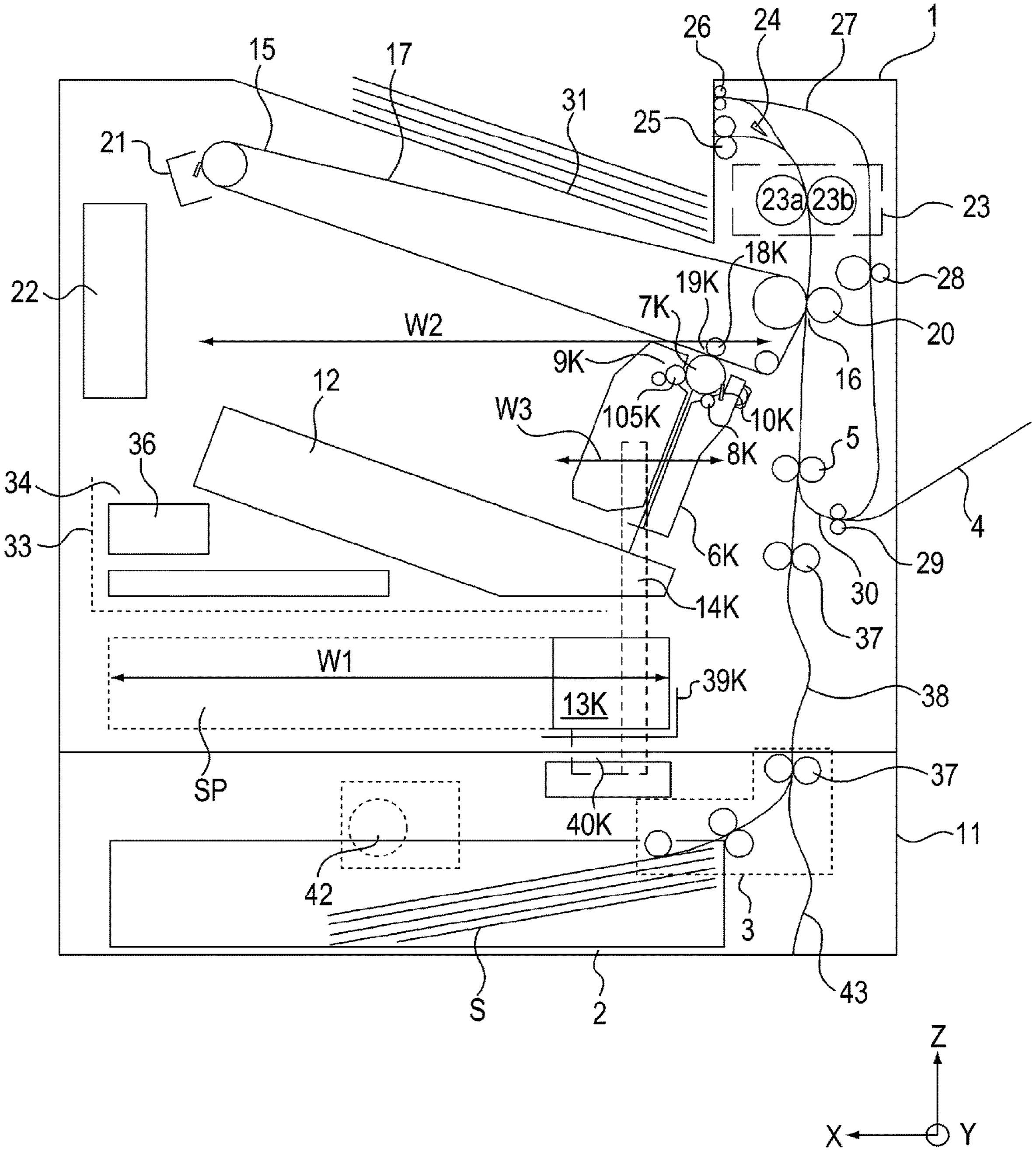

FIG. 8 is a sectional view of an image forming apparatus according to a second embodiment.

Figure 9:
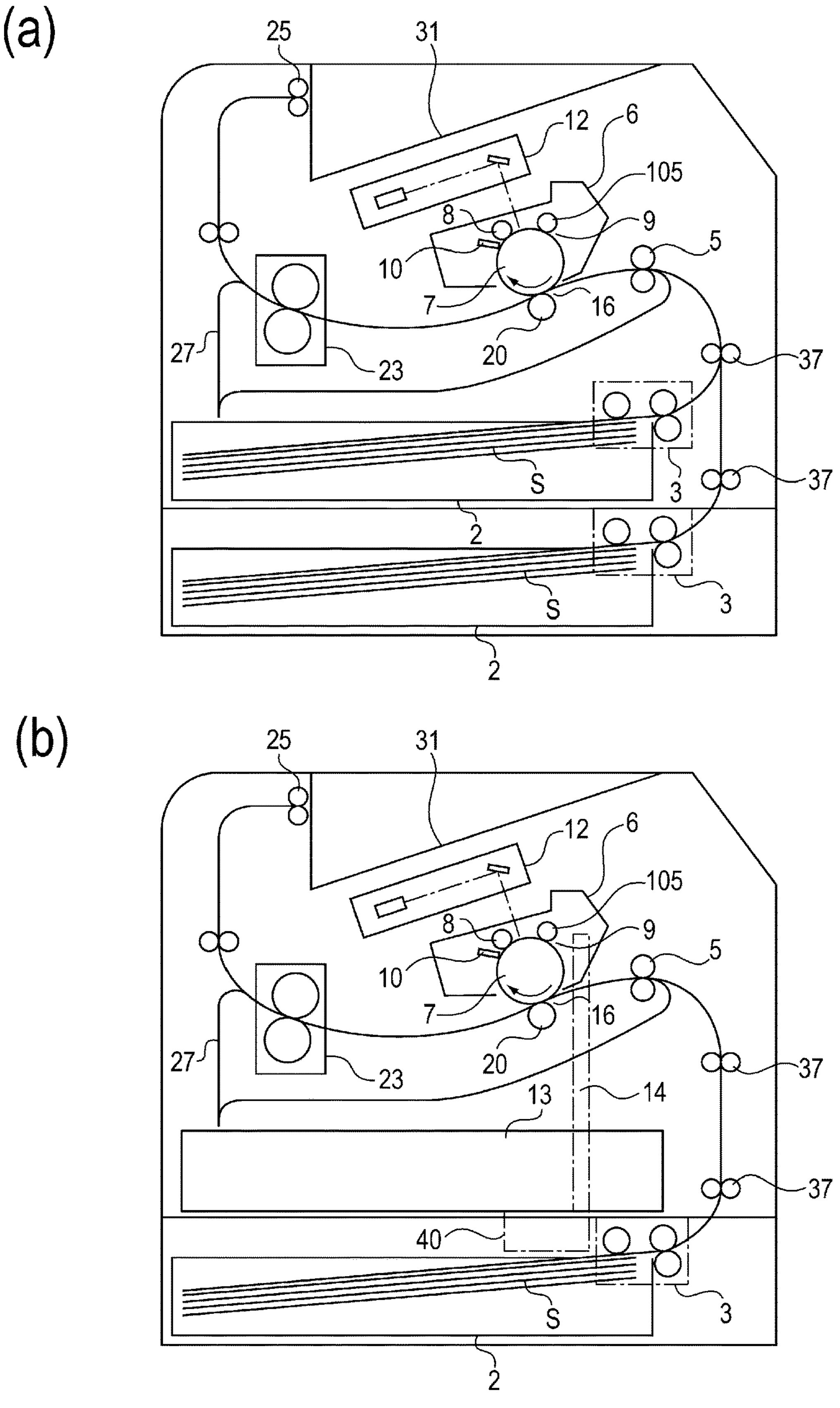

Parts (a) and (b) of FIG. 9 are sectional views of image forming apparatuses of a direct transfer type.

DESCRIPTION OF EMBODIMENTS

Embodiments of the present invention will be specifically described with reference to the drawings. Dimensions, materials, shapes and relative arrangements of constituent elements described in the following embodiments should be appropriately changed depending on structures and various conditions of apparatuses to which the present invention is applied, and the scope of the present invention is not intended to be limited thereto.

Embodiment 1

(Image Forming Apparatus)

Figure 2:
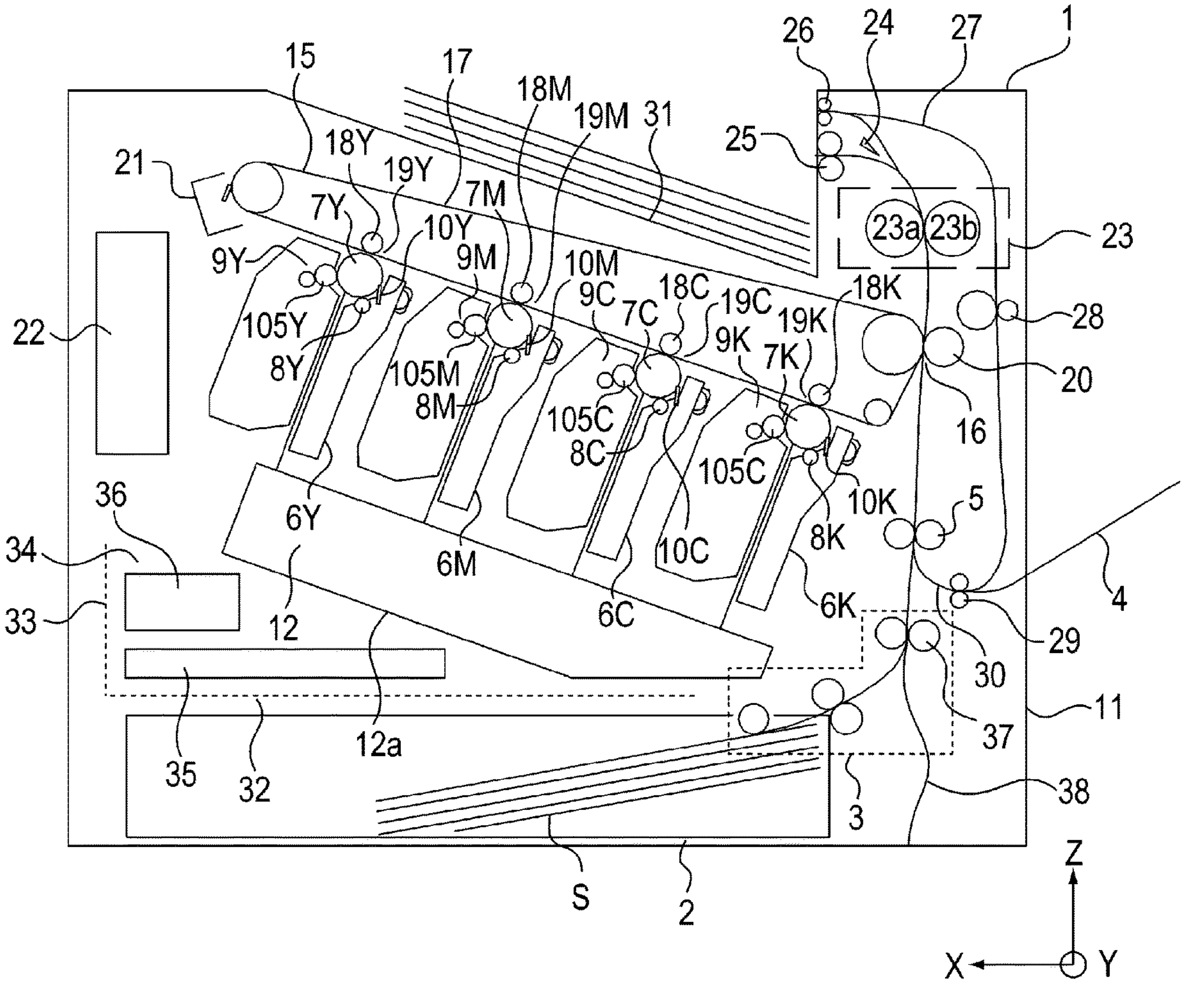
FIG. 2 is a sectional view of an integral-type image forming apparatus according to the first embodiment.

With reference to FIG. 2, a general structure of an image forming apparatus will be described. FIG. 2 is a sectional view showing the general structure of the image forming apparatus. The image forming apparatus of this embodiment is a lower beam printer capable of printing a color image on a sheet.

Incidentally, in the following description, a Z-axis direction shown in FIG. 2 is a height direction (up-down direction) of the image forming apparatus, and is a vertical direction. A Y-axis direction shown in FIG. 2 is a direction perpendicular to the Z-axis direction, i.e., a front-rear direction of the image forming apparatus, and is an axis direction which is a rotation center of a photosensitive member described later. Here, a front side of the image forming apparatus is a side (front surface side) where an operator such as a user or a service person faces an operating portion (not shown) for performing various inputs/settings with respect to the image forming apparatus. On the other hand, a rear side of the image forming apparatus is an opposite side (rear surface side) from the front side of the image forming apparatus. An X-axis direction shown in FIG. 2 is a direction perpendicular to the Z-axis and the Y-axis and is a direction (left-right direction) perpendicular to the up-down direction and the front-rear direction of the image forming apparatus.

(Feeding Portion)

As shown in FIG. 2, a cassette 2 which is an accommodating portion for accommodating sheets S is provided so as to be mountable in and dismountable from an apparatus main assembly 1 of the image forming apparatus. The sheets S are accommodated in the cassette 2 and fed one by one from the cassette 2 by a feeding portion 3 and sent to a registration roller pair 5 through an intermediary feeding roller pair 37. A sheet S set on a manual feeding portion 4 is set to the registration roller pair 5 through a refeeding roller pair 29. The registration roller pair 5 corrects oblique movement of the sheet S and feeds the sheet S to a secondary transfer portion 16 described later.

(Image Forming Portion)

The image forming apparatus includes an image forming portion for forming an image on the sheet S. In this embodiment, the image forming apparatus includes four image forming portions 6Y, 6M, 6C and 6K corresponding to yellow (Y), magenta (M), cyan (C) and black (K). Incidentally, the image forming portions have the same constitution except that colors of toners are different from each other, and therefore will be described as the image forming portion(s) 6 by omitting Y, M, C and K. This is ditto for the other members. The image forming portions 6 include photosensitive members 7 (7Y, 7M, 7C, 7K) and charging portions 8 (8Y, 8M, 8C, 8K) for electrically charging surfaces of the photosensitive members 7. Further, the image forming portions 6 include developing portions 9 (9Y, 9M, 9C, 9K) for developing electrostatic latent images, formed on the photosensitive members 7, with the toners as developers, and include cleaners 10 (10Y, 10M, 10C, 10K) for removing the toners remaining on the photosensitive members 7 after the transfer. The developing portions 9 include developing rollers 105 (105Y, 105M, 105C, 105K) for supplying the toners to the photosensitive members. The photosensitive member 7 and process means, actable on the photosensitive member 7, consisting of the charging portion 8, the developing portion 9 and the cleaner 10 integrally constitute an integral-type process cartridge which is mountable in and dismountable from the apparatus main assembly 1.

Below the photosensitive members 7 with respect to the vertical direction (Z-axis direction), a scanner unit 12 is provided. The scanner unit 12 is an optical scanning portion for scanning the photosensitive member 7 with light depending on image information. The scanner unit 12 in this embodiment is a laser scanner unit for scanning the photosensitive member 7 by deflecting laser light, emitted from a semiconductor laser, by a rotatable polygonal mirror.

(Transfer Portion)

With respect to the vertical direction (Z-axis direction), on the image forming portions 6, an intermediary transfer unit 15 is provided. The intermediary transfer unit 15 is obliquely disposed so that the secondary transfer portion 16 side thereof is positioned on a lower side (i.e., the left side is an upper side and the right side is a lower side with respect to the X-axis direction of FIG. 2) for the purpose of downsizing of the image forming apparatus. That is, the intermediary transfer unit 15 is disposed so as to be inclined with respect to the horizontal direction (X-axis direction). With the inclination, the image forming portions 6 and the scanner unit 12 are also obliquely disposed. An intermediary transfer belt 17 onto which the toner images formed on the photosensitive members 7 are transferred is a rotatable endless belt and is stretched by a plurality of stretching rollers. To an inner surface of the intermediary transfer belt 17, primary transfer rollers 18 (18Y, 18M, 18C, 18K) which are primary transfer members are contacted. The primary transfer rollers 18 form primary transfer portions 19 (19Y, 19M, 19C, 19K) in cooperation with the associated photosensitive members 7 through the intermediary transfer belt 17. At each of the primary transfer portions 19, by applying a voltage to the primary transfer roller 18, the toner image is primary-transferred from the associated photosensitive member 7 onto the 10194891(CFE06708) intermediary transfer belt 17. The intermediary transfer belt 17 and the plurality of the stretching rollers and the respective primary transfer rollers which stretch the intermediary transfer belt 17 are assembled into a unit as the intermediary transfer unit 15, and the intermediary transfer unit 15 is mountable in and dismountable from the apparatus main assembly 1 of the image forming apparatus.

A secondary transfer roller 20 which is a secondary transfer member contacts the intermediary transfer belt 17 and forms the secondary transfer portion 16 in cooperation with an opposite roller through the intermediary transfer belt 17. At the secondary transfer portion 16, the toner images are collectively secondary-transferred from the intermediary transfer belt 17 onto the sheet S. The toner remaining on the intermediary transfer belt 17 in a secondary transfer step is removed by a cleaning unit 21. The toner removed by the cleaning unit 21 is fed to a toner collecting container 22.

(Voltage Source Device)

As described above, the scanner unit 12 is obliquely disposed with respect to the horizontal direction. For that reason, the apparatus main assembly 1 includes a space 34, having a substantially triangular shape in cross-section, defined by a bottom 12*a* of the scanner unit 12, a partition plate 32 provided just above the cassette 2 of the feeding portion, and a left-side wall 33 of the apparatus main assembly 1. In the space 34, a low voltage source 35 and a high voltage source 36 are provided. The low voltage source 35 generates voltages applied to various motors, solenoids, fans and the like which are mounted in the image forming apparatus. Further, the high voltage sources 36 generates the charging portions 8, the developing portions 9, the primary transfer rollers 18, the secondary transfer roller 20 and the like.

(Fixing Portion)

The sheet S on which the toner images are transferred at the secondary transfer portion 16 is fed to a fixing portion 23. The fixing portion 23 includes a heating unit 23*a* including a heat source and includes a pressing roller 23*b* for forming a fixing nip in cooperation with the heating unit 23*a*. The sheet S carrying thereon unfixed toner images is heated and pressed in the nip while being nipped and fed through the fixing nip, so that the toner images are fixed on the sheet S.

(Discharge Portion, Re-Feeding Portion)

A feeding destination of the sheet S passed through the fixing portion 23 is switched to either one of a discharging roller pair 25 and a switch-back roller pair 26 by a switching member 24, and the sheet S is guided. In the case of one-side printing, the sheet S is guided to the discharging roller pair 25 by the switching member 24 and is discharged onto a sheet tray 31 by the discharging roller pair 25. The sheet tray 31 is provided above the intermediary transfer belt 17 with respect to the vertical direction, and receives the sheet S outputted from the inside of the image forming apparatus. In the case of double-side printing, the sheet S is guided to the switch-back roller pair 26 by the switching member 24, and is fed by the switch-back roller pair 26. Then, the sheet S in a nipped state by the switch-back roller pair 26 is fed to a double-side feeding passage 27 after a sheet end which is a trailing end of the sheet S is switched to a leading end of the sheet S by reversely rotating the switch-back roller pair 26. The sheet S fed to the double-side feeding passage 27 passes through a feeding roller pair 28 and the re-feeding roller pair 29 and is fed to the registration roller pair 5 again. At an end of the double-side feeding passage 27, a U-turn portion 30 exists. By providing the re-feeding roller pair 29 in the U-turn portion 30, stabilization of a feeding performance of the sheet S to the registration roller pair 5 is realized. The sheet S passed through the re-feeding roller pair 29 and the registration roller pair 5 passes through the secondary transfer portion 16 and the fixing portion 23, so that the image is formed on a second (back) surface of the sheet S similarly as in the case of a first (front) surface. Thereafter, the sheet S on which the images are formed on both sides is guided to the discharging roller pair 25 by the switching member 24, and is discharged on the sheet tray 31 by the discharging roller pair 25.

(Feeding Option)

Figure 3:
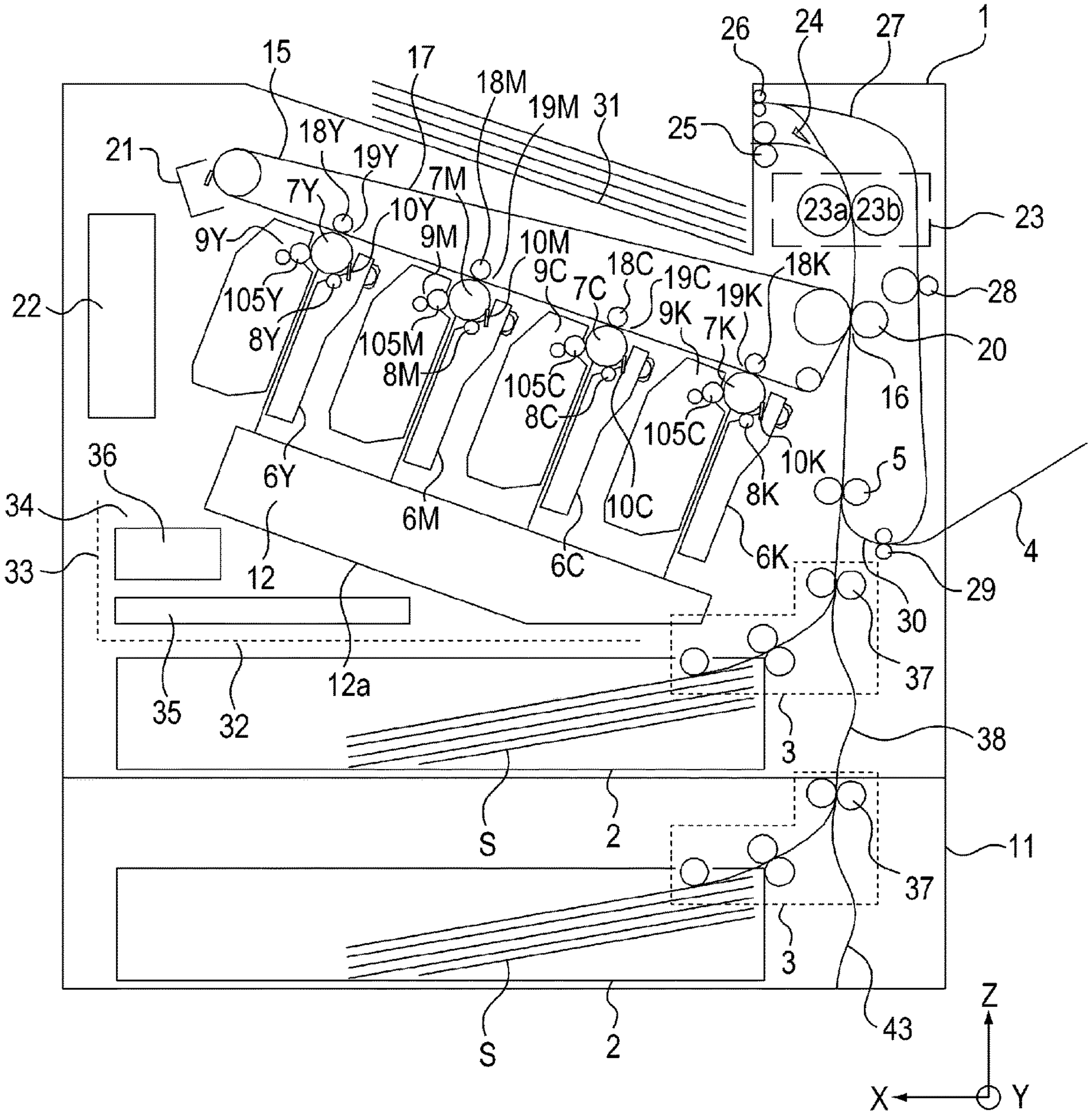
FIG. 3 is a sectional view of the integral-type image forming apparatus and a feeding option during connection therebetween.

FIG. 3 is a schematic sectional view showing a state in which a feeding option 11 is connected under the apparatus main assembly 1 of the image forming apparatus shown in FIG. 2. The feeding option 11 includes a cassette 2 which is an accommodating portion for accommodating sheets and a feeding portion 3 for feeding the sheets accommodated in the cassette 2. The cassette 2 is provided so as to be mountable in and dismountable from the feeding option 11. The cassette 2 and the feeding portion 3 are the same as those of the apparatus main assembly 1 described with reference to FIG. 2, and therefore, are represented by the same reference numerals.

The sheet S fed from the cassette 2 of the feeding option 11 is fed to a feeding option feeding passage 38, provided on the apparatus main assembly 1 side, by an intermediary feeding roller pair 37. Thereafter, the feeding option feeding passage 38 is merged with the feeding passage from another feeding portion at an upstream portion of the registration roller 5, and the sheet S is fed to the registration roller pair 5. Then, the sheet S is subjected to correction of oblique movement by the registration roller pair 5, and thereafter is fed to the secondary transfer portion 16.

The feeding option 11 is, as shown in FIGS. 2 and 3, capable of selectively mountable to the apparatus main assembly 1 of the image forming apparatus. Further, the feeding option 11 is not limited to the form in which a single feeding option is additionally provided to the apparatus main assembly 1 as shown in FIG. 2, but a plurality of stacked feeding options can be additionally provided to the apparatus main assembly 1. Incidentally, inside the feeding option 11, a vertical feeding passage 43 as a sheet feeding passage for receiving and guiding the sheet from a lower feeding option when the plurality of feeding options are stacked is provided.

(Difference of Types of Image Forming Apparatuses)

Incidentally, the image forming apparatuses described using FIGS. 2 and 3 are of a type (form) in which the image forming portion including, together with the photosensitive member and the developing portion, the toner accommodating portion accommodating the toner is provided (hereinafter, this image forming apparatus is referred to as an integral-type image forming apparatus). On the other hand, in the case where the toner accommodating portion is provided as a toner supply container capable of being exchanged (replaced) separately from the image forming portion including the photosensitive member and the developing portion and the toner is consumed in the image forming portion, there is also an image forming apparatus of a type in which the toner is supplied from the toner supply container to the image forming portion (hereinafter, this image forming apparatus is referred to as a supply-type image forming apparatus).

In the integral-type image forming apparatus, the toner can be directly supplied to the developing portion, and therefore, the image forming portion can be downsized, with the result that a size of entirety of the image forming apparatus can be suppressed. By the downsizing of the image forming apparatus, there is an advantage such that the image forming apparatus is capable of meeting the case where an installation space thereof is limited in a use environment. There is a tendency that the integral-type image forming apparatus is relatively inexpensive correspondingly to a simple component part structure when compared with the supply-type image forming apparatus.

On the other hand, as regards the supply-type image forming apparatus, the toner supply container provided separately from the image forming portion is mountable in and dismountable from the apparatus main assembly 1. For that reason, in the case where the toner is consumed, only the toner supply container is exchanged and a usable image forming portion can be continuously used, so that the cost per (one) sheet can be suppressed for a user or the like who uses the image forming apparatus for printing an image with a high print ratio in a large amount. However, positions of the image forming portion and the toner supply container (toner accommodating portion) are necessarily increased, and therefore, there is a need to provide, in the apparatus main assembly, a toner feeding mechanism for feeding the toner therebetween. Thus, there is a tendency that the image forming apparatus itself becomes complicated and correspondingly the cost thereof increases.

(Toner Supply Container of Supply-Type Image Forming Apparatus)

Figure 1:
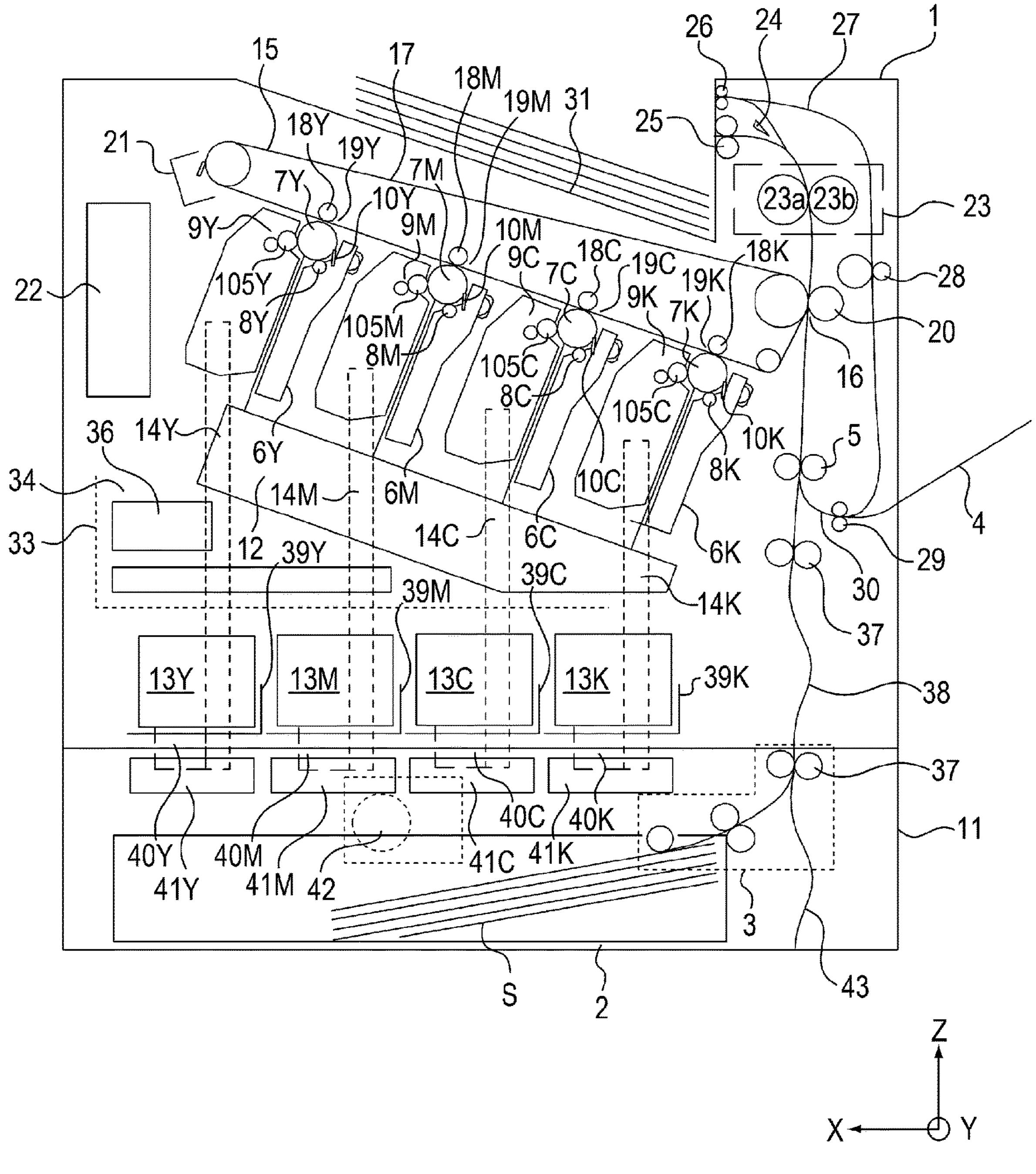
FIG. 1 is a sectional view of a supply-type image forming apparatus according to a first embodiment.

The supply-type image forming apparatus will be described using FIG. 1. FIG. 1 is a schematic sectional view of the supply-type image forming apparatus in this embodiment. Functional portions similar to those described with reference to FIGS. 2 and 3 are represented by the same reference numerals or symbols and will be omitted from description.

The supply-type image forming apparatus of this embodiment is an image forming apparatus capable of forming a color image on the sheet with toners of a plurality of colors, and a plurality of toner accommodating portions corresponding to the toners of the plurality of colors are mountable in the apparatus main assembly. As shown in FIG. 1, between the scanner unit 12 and the cassette 2, toner supply containers 13 (13Y, 13M, 13C, 13K) which are four toner accommodating portions accommodating the toners to be supplied to the developing portions 9 are provided so as to be arranged in the horizontal direction (direction parallel to the X-axis direction). The toner supply containers 13 are disposed on supporting rails 39 (39Y, 39M, 39C, 39K) and are mountable in and dismountable from the apparatus main assembly 1 of the image forming apparatus on the supporting rails 39 along the Y-axis direction. Inside the toner supply containers 13, toners for supply are filled. The toners accommodated in the toner supply containers 13 are supplied to the developing portions 9 by toner feeding mechanisms 14 (14Y, 14M, 14C, 14K) which are toner feeding units.

In the supply-type image forming apparatus shown in FIG. 1, in each of the image forming portions 6, a process cartridge constituted by integrally assembling the photosensitive member 7 and process means, actable on the photosensitive member 7, consisting of the charging portion 8, the developing portion 9 and the cleaner 10, is provided so as to be mountable in and dismountable from the apparatus main assembly 1. The supply-type image forming apparatus shown in FIG. 11 is different from the integral-type image forming apparatus shown in FIG. 3 is in that each of the developing portions 9 of the process cartridges is provided with an intake port (not shown) for taking in the toner fed by the associated toner feeding mechanism 14.

The sheet S is fed one by one from the cassette 2 by the feeding portion 3, and is fed to the registration roller pair 5 through the feeding option feeding passage 38 and the intermediary feeding roller pair 37. This sheet feeding passage is the same as the case where the sheet S is fed from the feeding option 11 in the integral-type image forming apparatus shown in FIG. 3. Accordingly, in either one of the types of the image forming apparatuses, a sheet feeding property may only be required to be verified, so that a man-hour for development can be reduced.

(Toner Feeding Mechanism)

Toner receiving ports 40 (40Y, 40M, 40C, 40K) for receiving the toners are provided at lower portions of the toner supply containers 13. The toners flowing in through the toner receiving ports 40 are moved toward the respective process cartridges by screws (not shown) in the toner feeding mechanisms 14. The screws are rotationally driven by drive transmission units 41 (41Y, 41M, 41C, 41K) and a driving source 42 connected thereto. That is, each of the toner feeding mechanisms 14 is driven by a driving unit consisting of the driving source 42 and the drive transmission unit 41, and supplies the toner from the toner supply container 13 to the developing portion 9 of the process cartridge.

(Frame Structure of Image Forming Apparatus)

Here, frame structures of the integral-type image forming apparatus shown in FIG. 3 and the supply-type image forming apparatus shown in FIG. 1 will be described. In this embodiment, commonality of frames for holding respective constituent units of the integral-type image forming apparatus and the supply-type image forming apparatus different in type (form) is achieved. In the following, description will be made specifically.

(Frame Structure of Integral-Type Image Forming Apparatus)

First, the frame structure in the integral-type image forming apparatus shown in FIG. 3 will be described using parts (a) and (b) of FIG. 6 and FIG. 7. Parts (a) and (b) of FIG. 6 are perspective views showing a first frame 50 in the integral-type image forming apparatus. FIG. 7 is a perspective view showing a second frame 51 in the integral-type image forming apparatus.

In the image forming apparatus of this embodiment, the frame is roughly divided into the first frame 50 and the second frame 51. To a lower portion of the first frame 50, the second frame 51 capable of holding the cassette 2 is selectively mountable. The frame structure in the integral-type image forming apparatus shown in FIG. 3 is such that the second frame 51 is mounted to the lower portion of the first frame 50. However, as in the case of the frame structure in the image forming apparatus shown in FIG. 2, it is also possible to employ a structure in which the second frame 51 is not provided to the lower portion of the first frame 50. The first frame 50 shown in parts (a) and (b) of FIG. 6 holds respective (portion) units, including the image forming portions 6, provided on a side downstream of the feeding option feeding passage 38 with respect to the sheet feeding direction. The second frame 51 shown in FIG. 7 holds the cassette 2 and the feeding portion 3 which are shown in FIG. 3.

The first frame 50 shown in parts (a) and (b) of FIG. 6 includes a lower space under an upper space holding the image forming portions 6. In this embodiment, the frame structure in which the second frame 51 is mounted to the lower portion of the first frame 50 is employed, so that the lower space under the upper space holding the image forming portions 6 and at an upper portion of the second frame 51. In the image forming apparatus of this embodiment, in the lower space of the first frame 50, the cassette 2 and the feeding portion 3 are held. As regards the cassette 2 mountable in and dismountable from the apparatus main assembly 1, in the lower space of the first frame 3, cassette rails 57*a* and 57*b* for permitting insertion of the cassette 2 accommodating the sheets S into the apparatus main assembly 1 and extraction of the cassette 2 from the apparatus main assembly 1 are mounted on left and right sides.

Each of the image forming portions 6 (6Y, 6M, 6C, 6K) held by the first frame 50 is an integral-type process cartridge in which the toner accommodating container, the developing roller, the photosensitive member, the charging device and the like are integrally assembled and is capable of being inserted into and extracted from the apparatus main assembly 1 in the Y-axis direction from the front side. These process cartridges have the same structure as those in the image forming apparatus described with reference to FIG. 3.

As shown in part (b) of FIG. 6, an image forming driving unit 53 including a driving source for driving the image forming portions 6 is mounted on a rear surface side of the image forming apparatus in the first frame 50. Here, the image forming driving unit 53 can be used in common with the image forming driving unit 53 (part (b) of FIG. 4) in the supply-type image forming apparatus described later. This is because the positions of the image forming portions 6 in the first frame 50 are the same between the integral-type image forming apparatus and the supply-type image forming apparatus.

(Frame Structure of Feeding Option in the Integral-Type Image Forming Apparatus)

As described above, in the case where the cassette 2 and the feeding portion 3 are held in the lower space of the first frame 50, to the lower portion of the first frame 50, the second frame 51 which is a frame of the feeding option 11 can be selectively mounted. As shown in FIG. 7, the second frame 51 is provided with a feeding option top plate 56 as a partition member between itself and the first frame 50 (at a boundary (surface) between the first frame 50 and the second frame 51). This feeding option top plate 56 is different in structure from a top plate 52 as a partition member provided on the second frame 51 in the supply-type image forming apparatus described later. Accordingly, the second frame 51 of the integral-type image forming apparatus shown in FIG. 7 has a structure such that the top plate 52 of the second frame 51 in the supply-type image forming apparatus is removed and the feeding option top plate 56 is mounted to the second frame in the integral-type image forming apparatus.

The feeding option top plate 56 is provided with positioning pins 58 which are positioning portions for positioning the feeding option top plate 56 relative to the first frame 50. At corresponding positions on the first frame 50 side, holes (not shown) for permitting engagement with the positioning pins 58 are provided. By this, when the first frame 50 and the second frame 51 are connected to each other, positional accuracy therebetween can be obtained. Incidentally, in this embodiment, two positioning pins 58 are used for positioning the first and second frames 50 and 51, but three or more positioning pins 58 may also be used, and positioning may also be made by rectifying the frame. Further, the image forming apparatus connected with the feeding option may be the integral-type image forming apparatus shown in FIGS. 2 and 3 or the supply-type image forming apparatus shown in FIG. 1.

Further, the feeding option top plate 56 is enhanced in torsional rigidity by providing a drawing portion, so that consideration to the case where a plurality of feeding options 11 are stacked and the case where the apparatus main assembly 1 or an unshown sheet discharge option is mounted on the feeding option 11 is given.

At a lower portion of the second frame 51 shown in FIG. 7, the cassette rails 57*a* and 57*b* for enabling insertion and extraction of the cassette 2 accommodating the sheets S relative to the feeding option 11 are provided on the left and right sides of the second frame 51. This structure is the same as the structure of the feeding option 11 described with reference to FIG. 2. Also as regards the feeding option 11, the cassette 2 similar to the cassette 2 capable of being mounted in and dismounted from the apparatus main assembly 1 is supported so as to be mountable and dismountable from the feeding option 11 in the Y-axis direction.

(Frame Structure of Supply-Type Image Forming Apparatus)

Next, the frame structure in the supply-type image forming apparatus shown in FIG. 1 will be described using parts (a) and (b) of FIG. 4 and parts (a) and (b) of FIG. 5. Parts (a) and (b) of FIG. 4 are perspective views showing the first frame 50 and the second frame 51 in the supply-type image forming apparatus. Parts (a) and (b) of FIG. 5 are perspective views showing the second frame 51 in the supply-type image forming apparatus.

Also in the image forming apparatus of this embodiment, the frame is roughly divided into the first frame 50 and the second frame 51. To a lower portion of the first frame 50, the second frame 51 capable of holding the cassette 2 is selectively mountable. The frame structure in the supply-type image forming apparatus shown in FIG. 1 is a structure such that the second frame 51 is mounted to the lower portion of the first frame 50. The first frame 50 shown in parts (a) and (b) of FIG. 4 holds respective (portion) units, including the image forming positions 6, provided on a side downstream of the feeding option feeding passage 38 shown in FIG. 1 with respect to the sheet feeding direction. The second frame 51 is shown in parts (a) and (b) of FIG. 5.

The first frame 50 shown in parts (a) and (b) of FIG. 4 includes a lower space under an upper space holding the image forming portions 6. In this embodiment, the frame structure such that the second frame 51 is mounted to the lower portion of the first frame 50 is employed, so that the lower space is disposed under the upper space holding the image forming portions 6 and on the second frame 51. In the image forming apparatus of this embodiment, in the lower space of the first frame 50, instead of the cassette 2 and the feeding portion 3, the toner supply containers 13 for supplying the toners to the developing portions of the image forming portions 6 are provided. This is different from the integral-type image forming apparatus.

Thus, in the case where the toner supply containers 13 are provided in the lower space of the first frame 50, mounting of a single second frame 51 is an essential requirement. For that reason, in the image forming apparatus of this embodiment, as shown in parts (a) and (b) of FIG. 4, the first frame 50, the second frame 51 and the top plate 52 as a partition member are integrally connected by connecting plates 54*a*, 54*b*, 54*c* and 54*d* provided at four corners of the frames and constitute a single frame in an entire apparatus. These frames are connected (fastened) with screws. As a fastening means, welding, adhesive bonding and the like may also be used.

Incidentally, also in the supply-type image forming apparatus, the feeding option 11 constituted by using the second frame 51 shown in FIG. 7 can be additionally provided by being stacked similarly as in the integral-type image forming apparatus.

Each of the image forming portions 6 (6Y, 6M, 6C, 6K) held by the first frame 50 in an integral-type process cartridge in which the toner accommodating container, the developing roller, the photosensitive member, the charging device and the like are integrally assembled, and the process cartridge is capable of being inserted into and extracted from the apparatus main assembly 1 in the Y-axis direction from the front (surface) side. Further, the image forming driving unit 53 including a driving source for driving the image forming portions 6 is mounted to the first frame 50 on the rear (surface) side of the apparatus. These members have the same structures as those for the first frame 50 described with reference to parts (a) and (b) of FIG. 6 and can be used in common. This is because positions of the image forming portions 6 in the first frame 50 are the same between the integral-type image forming apparatus and the supply-type image forming apparatus.

As shown in parts (a) and (b) of FIG. 5, the second frame 51 is provided with the top plate 52 as the partition member between itself and the first frame 50 (at a boundary (surface) between the first frame 50 and the second frame 51). This top plate 52 is different in structure from the feeding option top plate 56 as the partition member provided on the second frame 51 of the above-described integral-type image forming apparatus. Accordingly, the second frame 51 of the supply-type image forming apparatus shown in parts (a) and (b) of FIG. 5 has a structure such that the feeding option top plate 56 is removed from the second frame 51 in the integral-type image forming apparatus and the top plate 52 is mounted.

The top plate 52 is provided with positioning pins 58 which are positioning portions for positioning the top plate 52 relative to the first frame 50. At corresponding positions on the first frame 50 side, holes (not shown) for engagement with the positioning pins 58 are provided. By this, when the first frame 50 and the second frame 51 are connected to each other, positional accuracy therebetween can be achieved.

Further, in the case where the toner supply containers 13 are provided in the lower space of the first frame 50, the top plate 52 is provided with supporting rails 39 which are supporting members for supporting the toner supply containers 13. Further, the top plate 52 is provided with toner feeding mechanisms 14 which are toner feeding units for feeding the toners from the toner supply containers 13 to the developing portions 9.

Further, the top plate 52 of the second frame 51 is provided with driving units consisting of a driving source 42 for driving the toner feeding mechanisms 14 and drive transmission units 41. The drive transmission units 41 (41Y, 41M, 41C, 41K) are mounted below the top plate 52 so as to hang from the top plate 52. By this, a space above the cassette 2 can be effectively utilized.

The top plate 52 is roughly formed with a flat plate, and to which, the toner supply containers 13, the supporting rails 39, the toner feeding mechanisms 14 and the like can be mounted with accuracy. The top plate 52 is constituted by a single flat plate in this embodiment, but may also be divided into a plurality of flat (partition) plates. A mounting position of only a part of the divided partition plates is changed with respect to the Z-axis direction, whereby a holding position of the supply-type cartridge supported by the partition plate with respect to the Z-axis direction can be finely adjusted, so that effective layout can be realized from the viewpoint of space saving. Incidentally, in this embodiment, two positioning pins 58 are used for determining their positions relative to each other, but three or more positioning pins may also be used. Positioning may also be performed by rectifying the frame.

At the lower portion of the second frame 51, cassette rails (not shown) permitting insertion and extraction of the cassette 2 accommodating the sheets S relative to the image forming apparatus are mounted on the left and right sides. The cassette rails have the same structure as those for the feeding option 11 described with reference to FIG. 7. Also in the supply-type image forming apparatus, the cassette 2 is supported so as to be mountable and dismountable with respect to the Y-axis direction.

As described above, according to this embodiment, in the image forming apparatuses different in type (form), the apparatus main assembly frame can be commonized to the maximum. The apparatus main assembly frame is roughly divided into the first and second frames, and positions of the image forming portions 6 and the image forming driving unit 53 in the first frame are made the same between the integral-type image forming apparatus and the supply-type image forming apparatus. By this, without changing the first frame, a frame capable of meeting either type (form) can be easily prepared. Further, the partition member (top plate) between the first frame and the second frame is replaced depending on the type, and the supporting rails and the toner feeding mechanisms for the toner supply containers are mounted. By this, the frame of the supply-type image forming apparatus can be easily constituted, and the frame structure as the feeding option can also be easily constituted.

Incidentally, in this embodiment, as regards the transfer portion, the intermediary transfer belt onto which the toner images formed on the photosensitive members are transferred was used, but the present invention is not limited thereto. The present invention is also effective in an image forming apparatus of a type (form) in which a feeding belt for directly transferring toner images, formed on the photosensitive members, onto the sheet.

Further, in this embodiment, an optical scanning portion (scanner unit) for scanning the photosensitive members with light depending on image information was provided below the photosensitive members with respect to the vertical direction (Z-axis direction), but the present invention is not limited thereto. The present invention is also effective in image forming apparatuses in which the optical scanning portion is provided above the photosensitive members with respect to the vertical direction or provided on the left or right side with respect to the left-right direction.

Embodiment 2

An image forming apparatus according to an embodiment 2 is the image forming apparatus including a single image forming portion compared with the image forming apparatus including the four image forming portions in the first embodiment. The image forming apparatus according to the second embodiment shown in FIG. 8 is the image forming apparatus including the single image forming apparatus, and a monochromatic printer is illustrated as an example of the image forming apparatus of this embodiment. In this embodiment, the image forming apparatus is substantially the same as the supply-type image forming apparatus of the first embodiment except that a single image forming portion 6 and a single toner supply container 13 are provided, and therefore, members having the same functions are represented by the same reference numerals or symbols and will be omitted from description. In the following, only a point different from the embodiment 1 will be described.

The image forming apparatus of this embodiment is the image forming apparatus prepared by removing the image forming portion, other than the image forming portion for black, from the color printer as the supply-type image forming apparatus of the embodiment 1. Accordingly, the intermediary transfer belt 17 and the like remain although the image forming apparatus is the monochromatic printer. When commonality of the main assembly and constituent elements between the color printer of the embodiment 1 and the monochromatic printer of the embodiment 2 is achieved, there is an advantage such that costs relating to design and manufacturing of the apparatus are suppressed.

In FIG. 8, the monochromatic printer is constituted by using the frame for the color printer, so that there is a space SP in which the toner supply containers 13 for yellow, magenta and cyan are to be accommodated in the color printer. Therefore, in this embodiment, the toner supply container 13K for black has a size utilizing an entire area of the space SP and indicated by a broken line in FIG. 8. Specifically, with respect to a direction (X-axis direction) perpendicular to an axial direction of the photosensitive member 7, a width W1 of the toner supply container 13K is made substantially the same as a width W2 of the intermediary transfer belt 17 with respect to the X-axis direction. By this, the toner supply container 13K having a large volume can be used, so that an exchange frequency of the toner supply container can be reduced. Incidentally, as seen in the Y-axis direction, the shape of the toner supply container 13 may also be an elliptical shape or a circular shape. Further, the width W1 of the toner supply container 13 may only be required to be larger than a width W3 of at least the image forming portion 6 for black with respect to the X-axis direction.

Thus, the form of the supply-type image forming apparatus can be easily constituted by the monochromatic printer. The apparatus main assembly frame is commonized with the case of the color printer, and therefore, similarly as described in the first embodiment, the apparatus main assembly frame is divided into the first frame and the second frame, whereby the first frame can also be constituted in the integral-type image forming apparatus as the monochromatic printer, and the second frame can also be constituted in the feeding option capable of being extended by being connected to the monochromatic printer.

Incidentally, the object of the present invention is to commonize the apparatus main assembly frame to the maximum, so that the intermediary transfer belt is not necessarily used in the monochromatic printer as in the above-described embodiment. The present invention is also suitable for the image forming apparatus in which the image formed on the photosensitive member is directly transferred onto the sheet. As an embodiment of the image forming apparatus of a direct transfer type, part (a) of FIG. 9 is a schematic sectional view of an integral-type image forming apparatus, and part (b) of FIG. 9 is a schematic sectional view of a supply-type image forming apparatus. Incidentally, in the image forming apparatuses shown in parts (a) and (b) of FIG. 9, portions or members having the same functions as those of the image forming apparatuses in the above-described embodiments are represented by the same reference numerals or symbols and will be omitted from description.

Further, in the above-described embodiment, as the image forming apparatus, the printer was described as an example, but the present invention is not limited thereto. For example, other image forming apparatuses such as a copying machine, a facsimile apparatus or other image forming apparatuses such as a multi-function machine having functions of these machines in combination may also be used. By applying the present invention to these image forming apparatuses, a similar effect can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-074800 filed on Apr. 10, 2019, which is hereby incorporated by reference herein in its entirety.

What is claimed is:

1. An image forming apparatus comprising:

a first frame configured to support an image forming portion including a photosensitive member and a developing portion configured to develop, with toner, an electrostatic latent image formed on the photosensitive member, the image forming portion being configured to form an image on a sheet;

a scanner configured to scan the photosensitive member; and a second frame mounted to the first frame such that the second frame is located below the first frame, the second frame being provided with (i) a supporting member configured to support a supply container containing toner such that the supply container is located below the scanner, (ii) a toner feeding unit configured to feed the toner from the supply container to the developing portion, (iii) an accommodating portion configured to accommodate the sheet, and (iv) a feeding portion configured to feed the sheet accommodated in the accommodating portion, wherein the first frame is configured to support the image forming portion such that the photosensitive member is located above the scanner.

2. The image forming apparatus according to claim 1, wherein the second frame includes a top plate.

3. The image forming apparatus according to claim 2, wherein the toner feeding unit is located above the top plate.

4. The image forming apparatus according to claim 3, wherein the second frame is provided with the driving unit configured to drive the toner feeding unit, the driving unit is located below the top plate.

5. The image forming apparatus according to claim 3, wherein the supporting member is located above the top plate.

6. The image forming apparatus according to claim 2, wherein the supporting member is located above the top plate.

7. The image forming apparatus according to claim 2, wherein the accommodating portion and the feeding portion are located below the top plate.

8. The image forming apparatus according to claim 2, wherein the top plate is provided with a positioning pin for positioning the top plate relative to the first frame.

9. The image forming apparatus according to claim 1, wherein the toner feeding unit is configured to feed the toner to the developing portion located above the scanner.

* * * * *